H. L. McCOY & W. B. BOATRIGHT.
HOIST.
APPLICATION FILED JAN. 24, 1911.
999,665.
Patented Aug. 1, 1911.
2 SHEETS—SHEET 1.
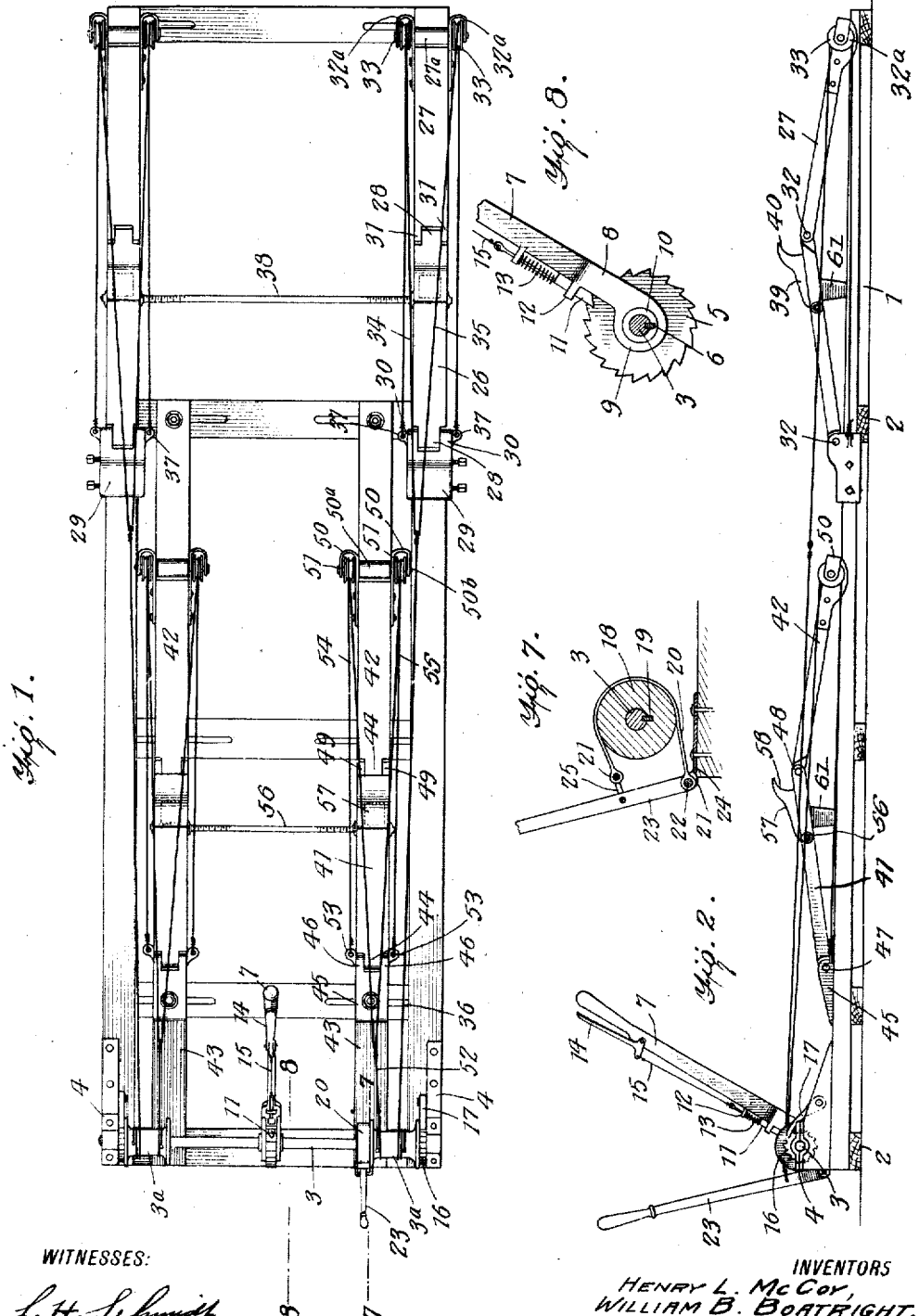
WITNESSES:
INVENTORS
HENRY L. McCoy,
WILLIAM B. BOATRIGHT,
BY
ATTORNEYS

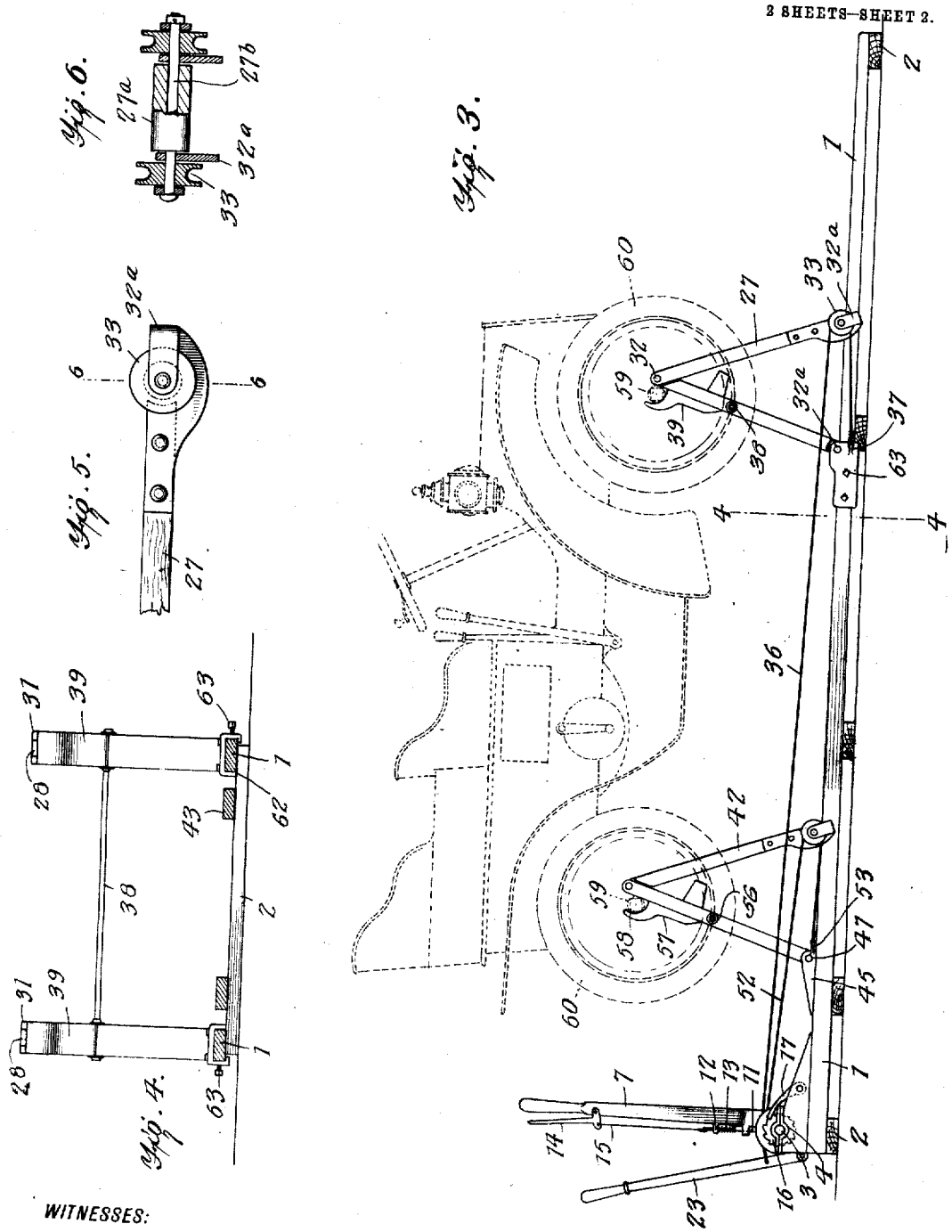

ns.

UNITED STATES PATENT OFFICE.

HENRY L. McCOY AND WILLIAM B. BOATRIGHT, OF MATHIS, TEXAS.

HOIST.

999,665.

Specification of Letters Patent.   Patented Aug. 1, 1911.

Application filed January 24, 1911.   Serial No. 604,339.

*To all whom it may concern:*

Be it known that we, HENRY L. McCOY and WILLIAM B. BOATRIGHT, citizens of the United States, and residents of Mathis, State of Texas, have invented certain new and useful Improvements in Hoists, of which the following is a specification.

Our invention is an improvement in hoists, and consists in certain novel constructions and combinations of parts, hereinafter described and claimed.

The object of the invention is to provide a simple, cheap, and easily operated device of the character specified for lifting vehicles, especially motor vehicles of considerable weight, by means of which the heaviest vehicle may be lifted with a small expenditure of force, and may be held in elevated position and without changing the relative position of the parts of the vehicle.

Referring to the drawings forming a part hereof, Figure 1 is a plan view of the improvement. Fig. 2 is a side view of the improvement in lowered position. Fig. 3 is a similar view with the parts in elevated position. Fig. 4 is a section on the line 4—4 of Fig. 3. Fig. 5 is a side view of the free end of one of the toggle levers. Fig. 6 is a section on the line 6—6 of Fig. 5, and, Figs. 7 and 8 are sections on the lines 7—7 and 8—8, respectively, of Fig. 1.

The embodiment of the invention shown in the drawings, comprises a frame composed of longitudinal bars 1, connected by cross bars 2 arranged beneath the longitudinal bars. A shaft 3 is journaled transversely of the frame at one end, in bearings 4, and a ratchet wheel 5 is secured to the shaft at approximately its center, by a key 6. A lever 7 is provided with a fork 8, and the arms of the fork are provided with bearings 9, journaled on the hub 10 of the ratchet wheel. A pawl or catch 11 is slidable in bearings 12 on the lever, and coöperates with the ratchet wheel. The pawl or catch is held normally in engagement with the ratchet wheel by a spring 13, and a grip 14 is pivoted on the lever and connected with the catch by a link 15, for operating the pawl.

A reel 3ª is secured to the shaft at each end, and each reel is provided with a coaxial ratchet wheel 16, and a holding pawl 17, coöperates with each wheel to prevent reverse rotation of the shaft and reels. A brake is also provided for the shaft. The said brake, (Fig. 7) comprises a disk 18 secured on the shaft by a key 19, and a strap 20 encircles the disk. The strap is provided at each end with a collar 21, one of which encircles a pin 22 extending laterally from a lever 23 pivoted at 24 on the frame. The other collar 21 is engaged by a loop 25 on the lever, and it will be evident that when the lever 23 is moved in a direction to tighten the strap on the disk, the speed of the shaft will be checked or held, depending upon the force exerted. The movement of the shaft may be controlled by means of the brake.

A plurality of oppositely arranged pairs of toggle levers are arranged on the frame, one pair being at the end remote from the shaft 3, and the other pair being at the end adjacent to the said shaft. Each of the first named pair of levers consists of two members 26 and 27, and the member 26 is provided at each end with a reduced portion forming a lug 28. A bracket 29 is secured to each bar 1, and each bracket is provided with a pair of spaced ears 30, between which the lug is received. The inner end of the other member 27 is also provided with a pair of spaced ears 31, and the other lug of the member 26 is received between the ears. Pivot pins 32 are passed through registering openings in the ears of the lugs, thus hinging one end of the member 26 to the bracket, and the other end to the member 27. The free end of each member 27 is provided with a stirrup or hanger 32ª at each side thereof. A roller 27ª (see Fig. 6) is journaled between each pair of hangers. A pulley 33 is arranged between the arms of each hanger and a journal pin 27ᵇ is passed through both pulleys and the roller, thus journaling the two pulleys and the roller on a single axis. A flexible strand 36 is secured to and winds upon each reel 3ª at one end thereof, and the said strand 36 branches near the bracket 29 into two branches 34 and 35. The branches 34 and 35 pass over the pulleys 33, one branch over each pulley, and thence each branch passes backward toward the adjacent bracket 29, and is secured to an eye 37 on the bracket. The members 26 of the toggle levers are connected by a brace rod 38, and a block 39 provided with a transverse groove or seat 40 is secured to each of the said members near its connection with the member 27.

It will be evident from the description, that when the shaft 3 is rotated, the free end of the member 27 of each toggle will be drawn toward the reel. The toggle levers will then be broken, and the adjacent ends of the members 26 and 27 will be lifted as indicated in Fig. 3. The other pair of toggle levers, comprise each a pair of members 41 and 42. A plate 43 is arranged on the cross bars 2 adjacent to each of the bars 1 and on the inner side thereof, and spaced apart therefrom.

Each of the members 41 and 42 is provided at one end with a central lug 44, and a bracket 45 similar to the bracket 29 and having similar ears 46, is secured to each plate near the shaft 3. The lug 44 of the member 41 is received between the ears and pivoted thereto by a pin 47. The outer end of the member 41 is provided with a pair of spaced ears 49 and the lug 44 of the member 42 is received between the ears and pivoted thereto by a pin 48. The free end of each of the members 42 is provided at each side with a hanger or stirrup 50 and a roller 50ª is arranged between the hangers. A pulley 51 is arranged between the arms of each hanger and a journal pin 50ᵇ is passed through the rollers and the pulley, the construction being the same as that described for the members 27. A flexible strand 52 is secured to and winds upon each reel 3ª at the opposite end from the strand 36, and the said strand 52 branches near the bracket 45 into two branches 54 and 55. The branches 54 and 55 pass over the pulleys and back toward the shaft 3, and the end of each is secured to an eye 53 on the adjacent bracket 45. The members 41 of the toggle are connected by a brace rod 56 near the connection with the members 42, and a block 57 is secured to each of the said members 41 adjacent to the said connection. Each block is provided with a transverse groove or seat 58.

It will be evident from the description that the pairs of toggle levers are substantially alike in construction and operation. Each toggle lever is adapted to engage the axle of the vehicle to be lifted, the said axle resting on the seats 40 and 58 of the blocks 39 and 57. The toggle levers are beneath the vehicle and they move in unison, so that the vehicle is lifted vertically without disturbing the relative positions of the parts.

Each of the members 26 of the one pair of toggle levers, and each of the members 41 of the other pair is provided with a block 61 on its under face, for engaging the plate 43 or the bar 1, to prevent the toggle levers from moving into alinement. The brackets 29 and 45 are in the form of channel plates, and the channel 62 of each plate receives the bar 1 or the plate 43, and each bracket is slidable, so that it may be adjusted. Each plate is held in adjusted position by set screws 63, (Fig. 4).

In operation, the vehicle is moved into position over the toggle levers, and the shaft 3 and reels 3ª are rotated by means of the lever 7, which is oscillated to move the ratchet wheel forward. The rear face of the catch or pawl 11 is beveled as shown in Fig. 8, so that the lever may move rearward freely, without the point engaging the teeth. As the shaft is rotated, the strands 36 and 52 are wound on the reels, and the free end of each toggle lever is drawn toward the hinged end. When the seats engage the axles, the vehicle is lifted, and when in proper position, it is so held by the pawls 17. The said pawls also prevent reverse movement of the shaft when the pawl 11 is released on the reverse movement of the lever 7. When it is desired to lower the vehicle, the shaft is moved forward by the lever 7, and held by the brake. The pawls 11 and 17 are now released, and the brake is loosened slightly to permit the shaft 3 to rotate slowly. Should, for any reason, during the elevating of the vehicle, the pawls fail to hold, the brake would prevent damage.

The bars 1 and the plates 43 are adjustable on the cross bars 2 so that the frame may be adjusted to any width of vehicle.

We claim:

1. A hoist comprising a frame, a shaft journaled transversely of the frame at one end, a reel secured to each end of the shaft, a plurality of pairs of toggle levers on the frame, the members of each pair being spaced transversely of the frame, and the pairs being spaced apart longitudinally of the frame, a bracket adjustable longitudinally of the frame at the end of each of the said levers adjacent to the shaft, each of the said levers consisting of two members hinged together at one end, one of the members being hinged at the other end to the adjacent bracket, a pair of pulleys secured to the other end of the other member, a flexible strand for each lever winding on the reel at one end, and branching at the other end, the branches passing over the pulleys and extending to a connection with the bracket to which the lever is hinged, a ratchet wheel secured to the shaft intermediate its ends, a lever having a fork, the arms of the fork being journaled on the shaft on opposite sides of the ratchet wheel, a pawl on the lever for engaging the ratchet wheel, means for preventing reverse movement of the shaft, a disk on the shaft, a strap encircling the disk, a lever pivoted to the frame and connected with the strap for tightening the same, and a seat on each of the members of the toggle levers connected to the frame.

2. A hoist comprising a frame, a shaft journaled transversely of the frame at one end, a reel secured to each end of the shaft, a plurality of pairs of toggle levers on the frame, the members of each pair being spaced transversely of the frame, a bracket adjustable longitudinally of the frame at the end of each of the said levers adjacent to the shaft, each of the said levers consisting of two members hinged together at one end, one of the members being hinged at the other end to the adjacent bracket, a pair of pulleys secured to the other end of the other member, a flexible strand for each lever winding on the reel at one end, and branching at the other end, the branches passing over the pulleys and extending to a connection with the bracket to which the lever is hinged, a ratchet wheel secured to the shaft intermediate its ends, a lever having a fork, the arms of the fork being journaled on the shaft on opposite sides of the ratchet wheel, a pawl on the lever for engaging the ratchet wheel, means for preventing reverse movement of the shaft, a brake in connection with the shaft, and a seat on each of the members of the toggle levers connected to the frame.

3. A hoist comprising a frame, a shaft journaled transversely of the frame at one end, a reel secured to each end of the shaft, a plurality of pairs of toggle levers on the frame, the members of each pair being spaced transversely of the frame, and the pairs being spaced apart longitudinally of the frame, a bracket adjustable longitudinally of the frame at the end of each of the said levers adjacent to the shaft, each of the said levers consisting of two members hinged together at one end, one of the members being hinged at the other end to the adjacent bracket, a pair of pulleys secured to the other end of the other member, a flexible strand for each lever winding on the reel at one end, and branching at the other end, the branches passing over the pulleys and extending to a connection with the bracket to which the lever is hinged, a ratchet wheel secured to the shaft intermediate its ends, a lever having a fork, the arms of the fork being journaled on the shaft on opposite sides of the ratchet wheel, a pawl on the lever for engaging the ratchet wheel, a brake in connection with the shaft, and a seat on each of the members of the toggle levers connected with the frame.

4. A hoist comprising a frame, a shaft journaled transversely of the frame at one end, a reel secured to each end of the shaft, a plurality of pairs of toggle levers on the frame, the members of each pair being spaced transversely of the frame, and the pairs being spaced apart longitudinally of the frame, a bracket adjustable longitudinally of the frame, at the end of each of the said levers adjacent to the shaft, each of the said levers consisting of two members hinged together at one end, one of the members being hinged at the other end to the adjacent bracket, a pair of pulleys secured to the other end of the other member, a flexible strand for each lever winding on the reel at one end, and branching at the other end, the branches passing over the pulleys and extending to a connection with the bracket to which the lever is hinged, means for intermittently rotating the shaft, a brake in connection with the shaft, and means on the toggle lever for engaging a vehicle to support the same.

5. A hoist comprising a frame, a shaft journaled transversely of the frame at one end, a reel secured to each end of the shaft, a plurality of pairs of toggle levers on the frame, the members of each pair being spaced transversely of the frame, and the pairs being spaced apart longitudinally of the frame, said levers having means for engaging a vehicle to support the same, a bracket adjustable longitudinally of the frame, at the end of each of the said levers adjacent to the shaft, each of the said levers consisting of two members hinged together at one end, one of the members being hinged at the other end to the adjacent bracket, a pair of pulleys secured to the other end of the other member, a flexible strand for each lever winding on the reel at one end, and branching at the other end, the branches passing over the pulleys and extending to a connection with the bracket to which the lever is hinged, means for intermittently rotating the shaft, and a brake in connection with the shaft.

6. A hoist comprising a frame, a plurality of pairs of toggle levers on the frame, the members of each pair being spaced apart transversely of the frame, and the pairs being spaced apart longitudinally of the frame, each of the said levers consisting of two members hinged together at their adjacent ends, one of the members being hinged at the other end to the frame, the outer end of the other member of each pair being provided with a pulley on each side thereof, a flexible strand passing over each pulley, the strands being connected together at one end, and being connected to the frame at the opposite end on the same side of the pulley, and means engaging the connected ends of the strand for simultaneously drawing the free ends toward the fixed ends of the levers.

HENRY L. McCOY.
WILLIAM B. BOATRIGHT.

Witnesses:
G. W. VOTAW,
FRANK J. BOSSHARDT.